(12) United States Patent
Kirisken

(10) Patent No.: US 10,990,426 B2
(45) Date of Patent: Apr. 27, 2021

(54) MOBILE VIRTUALIZATION

(71) Applicant: VESTEL ELEKTRONIK SANAYI VE TICARET A.S., Manisa (TR)

(72) Inventor: Barbaros Kirisken, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 16/335,038

(22) PCT Filed: Oct. 6, 2016

(86) PCT No.: PCT/EP2016/073895
§ 371 (c)(1),
(2) Date: Mar. 20, 2019

(87) PCT Pub. No.: WO2018/065057
PCT Pub. Date: Apr. 12, 2018

(65) Prior Publication Data
US 2019/0278623 A1     Sep. 12, 2019

(51) Int. Cl.
*G06F 9/455* (2018.01)
(52) U.S. Cl.
CPC ...... *G06F 9/45545* (2013.01); *G06F 9/45533* (2013.01); *G06F 9/45558* (2013.01);
(Continued)
(58) Field of Classification Search
None
See application file for complete search history.

(56) References Cited

U.S. PATENT DOCUMENTS 8,091,084 B1 *  1/2012  Dobrovolskiy ..... G06F 9/45558
                                                          717/174
8,117,554 B1 *  2/2012  Grechishkin ....... G06F 3/04817
                                                          715/764
(Continued)

FOREIGN PATENT DOCUMENTS

EP    2808781    12/2014
EP    2894863    7/2015
(Continued)

OTHER PUBLICATIONS

The International Preliminary Report on Patentability for PCT/EP2016/073895 dated Dec. 20, 2018, pp. 1-19.
(Continued)

*Primary Examiner* — Isaac T Tecklu
(74) *Attorney, Agent, or Firm* — McDonnell Boehnen Hulbert & Berghoff LLP

(57) ABSTRACT

The present invention provides a virtualization system at least comprising a first device (101) having a first operating system (202) and a first display screen. The virtualization system also at least comprises a second display screen (105), which is separate from the first device, but which is connectable to the first device (101), for example by cable (104a) or wireless (104b) connection. The first device has a virtualization application (103) operable as a guest operating system (203) of the first operating system (202) acting as a host operating system. The guest operating system (203) is a desktop operating system or a desktop-optimized operating system. The virtualization application (103) is launched upon connection of the second display screen (105) to the first device (101) for display of the guest operating system (203) on the second display screen (105). The system may optionally further comprise one or more peripheral components, such as a keyboard (106) and/or a mouse (107), for example. The system can determine whether to mirror the (Continued)

screen contents of the first device (101) on the second display screen (105) or whether to display the guest operating system (203) on the second display screen (105), according to a predetermined condition, for example according to whether such peripheries are connected. The present invention also provides a corresponding method of virtualizing a desktop operating system or a desktop-optimized operating system on a first device (101), such as a mobile device, for display on a second display screen (105), such as a monitor or TV screen.

13 Claims, 4 Drawing Sheets

(52) U.S. Cl.
CPC ............... *G06F 2009/4557* (2013.01); *G06F 2009/45562* (2013.01)

(56) References Cited

U.S. PATENT DOCUMENTS

| | | | | |
|---|---|---|---|---|
| 8,387,048 | B1 * | 2/2013 | Grechishkin | G06F 9/45533 718/1 |
| 8,732,607 | B1 * | 5/2014 | Grechishkin | G06F 3/04817 715/781 |
| 9,317,195 | B1 * | 4/2016 | Grechishkin | G06F 3/0486 |
| 2006/0070065 | A1 * | 3/2006 | Zimmer | G06F 9/45558 718/1 |
| 2012/0054671 | A1 | 3/2012 | Thompson et al. | |
| 2012/0084542 | A1 * | 4/2012 | Reeves | G06F 9/4411 713/1 |
| 2013/0145144 | A1 * | 6/2013 | Newell | G06F 9/452 713/100 |
| 2013/0145366 | A1 * | 6/2013 | Newell | G06F 9/441 718/1 |
| 2014/0026068 | A1 * | 1/2014 | Park | G06F 3/0486 715/748 |
| 2016/0087836 | A1 * | 3/2016 | Abramson | H04L 45/02 709/223 |

FOREIGN PATENT DOCUMENTS

| | | |
|---|---|---|
| JP | 2009-518703 | 5/2009 |
| JP | 2009-181318 | 8/2009 |
| WO | 2013/053849 | 4/2013 |

OTHER PUBLICATIONS

The International Search Report (ISR) for PCT/EP2016/073895 dated Dec. 15, 2016, pp. 1-3.

Written Opinion of the International searching Authority for PCT/EP2016/073895 dated Dec. 5, 2016, pp. 1-6.

Office Action for Japanese 2019-512921, dated Oct. 9, 2020 (translation attached).

* cited by examiner

MOBILE VIRTUALIZATION

CROSS-REFERENCE TO RELATED APPLICATION

This application is a U.S. national phase of International Application No. PCT/EP2016/073895, filed Oct. 6, 2016, which is incorporated by reference herein in its entirety.

BACKGROUND OF THE INVENTION

Mobile devices, such as smart phones and tablet computers, now have enough computational power to be able to replicate basic desktop computer functionalities. It is known to connect a mobile device, such as a smart phone or tablet computer, to a second display screen, such as a monitor or a TV screen, via a wireless or cable connection, for example. This is generally done for screen mirroring, so that a user can enlarge the display area of the mobile device by use of such an additional screen. However, screen mirroring is generally not targeted at desktop computer replacement. Other than screen mirroring, mobile virtualization or creating a secondary desktop-compatible screen and compatible applications are recent approaches which have been explored for using mobile devices to replicate desktop computer functionalities. For example, US 2016/0087836 describes moving seamlessly between a mobile device and a desktop computer with regard to applications, display of information, transfer of data and swapping the active device. EP 2 894 863 describes a methodology to transfer a video stream between two different mobile devices. US 2012/054671 describes controlling a virtual machine, which is reflected to the screen of a mobile device via a virtual keyboard.

Virtualizing a desktop in a mobile environment would be preferable to creating a secondary desktop-compatible screen and desktop-compatible applications. However, some critical problems are foreseen for such mobile virtualization. Firstly, it is not easy to start a hypervisor (also known as a virtual machine monitor, or VMM) for virtualization in a mobile device and send it to a secondary display screen, whilst keeping a first display screen of the mobile device alive for running mobile applications and so that a host operating system of the mobile device is still working. Furthermore, there is no efficient way for the guest operating system and hypervisor to be launched. A user may also need screen mirroring instead of a desktop operating system to be displayed on the second display screen. Manual switching between these two different modes of operation is possible, but is time-consuming and needs extra operation by the user. Sometimes, applications and/or data need to be transferred from the host operating system to the guest operating system, or vice versa. Finally, because the system is not a desktop native system and a user does not want to wait for system reboots (since the guest operating system is a completely separate hardware simulation), instantaneous launch of the guest desktop operating system would be highly desirable.

OBJECT OF THE INVENTION

It is therefore an object of the invention to provide a virtualization system for virtualizing a desktop or desktop-optimized operating system on a device such as a mobile device for display on a second display screen, such as a monitor or TV screen, as well as a corresponding method.

DESCRIPTION OF THE INVENTION

The object of the invention is solved by a virtualization system according to claim 1. Preferably, the virtualization system at least comprises a first device having a first operating system and a first display screen, and the virtualization system also at least comprises a second display screen separate from the first device. The second display screen is connectable to the first device. The first device has a virtualization application operable as a guest operating system of the first operating system, which acts as a host operating system thereof. The guest operating system is a desktop operating system or a desktop-optimized operating system. The virtualization application is launched upon connection of the second display screen to the first device for display of the guest operating system on the second display screen.

Thus, when the second display screen is connected to the first device, the virtualization application is launched automatically and continues to run for as long as the second display screen remains connected to the first device. On the other hand, if the second display screen is disconnected from the first device, the virtualization application does not launch and/or ceases to run. The virtualization application may optionally be launched to run in the background of the first device, although this is not mandatory.

Advantageous embodiments of the invention may be configured according to any claim and/or part of the following description.

Preferably, the first device is a mobile device and the first operating system is a mobile operating system. Since, in general, mobile devices have multiple screen support, this has the advantage of allowing for display of the guest operating system on the second display screen when the second display screen is connected to the first device, without loss of screen content from the first display screen of the mobile device. Preferably, the second display screen is a computer monitor or a TV screen.

It is preferable that the first device comprises a memory storing a snapshot of the guest operating system and that the virtualization application is launched using the snapshot of the guest operating system stored in the memory of the first device. This has the advantage of allowing for instantaneous, or near-instantaneous, launch of the virtualization application.

Preferably, transfer of data between the first operating system and the guest operating system is isolated. If so, the system may further comprise a lookup table consisting of rules and a common folder between the first operating system and the guest operating system which are usable to isolate the transfer of data.

It is preferable that the system can mirror an image displayed on the first display screen on the second display screen, and is switchable between such screen mirroring and display of the guest operating system on the second display screen. This has the advantage of allowing a user to use for system for screen mirroring, as well as for desktop virtualization, depending upon user requirements.

If so, a condition for said switching is predetermined. For example, the predetermined condition may at least comprise switching to screen mirroring if video is displayed on the first display screen. Alternatively or additionally, the system may further comprise at least one other peripheral component, such as a keyboard and/or a mouse, and the predetermined condition may at least comprise switching to display of the guest operating system on the second display screen if the at least one other peripheral component is connected to the system. This has the advantage of allowing the system to automatically detect when desktop virtualization may be preferred to screen mirroring.

On the other hand, a condition for said switching may instead be selectable by a user.

The present invention also relates to a method of virtualizing a desktop operating system or a desktop-optimized operating system on a first device. The method at least comprises providing the first device with a first operating system; providing the first operating system with a virtualization application to run a desktop operating system or a desktop-optimized operating system; connecting the first device to a second display screen; launching the virtualization application upon connection of the second display screen to the first device; operating the desktop operating system or desktop-optimized operating system as a guest operating system of the first operating system acting as a host operating system; and displaying the guest operating system on the second display screen.

The present invention further relates to a computer program product or a program code or system for executing one or more than one of the herein described methods.

Further features, goals and advantages of the present invention will now be described in association with the accompanying drawings, in which exemplary components of the invention are illustrated. Components of the systems and methods according to the invention which are at least essentially equivalent to each other with respect to their function can be marked by the same reference numerals, wherein such components do not have to be marked or described in all of the drawings.

In the following description, the invention is described by way of example only with respect to the accompanying drawings.

DETAILED DESCRIPTION

Figure 1:
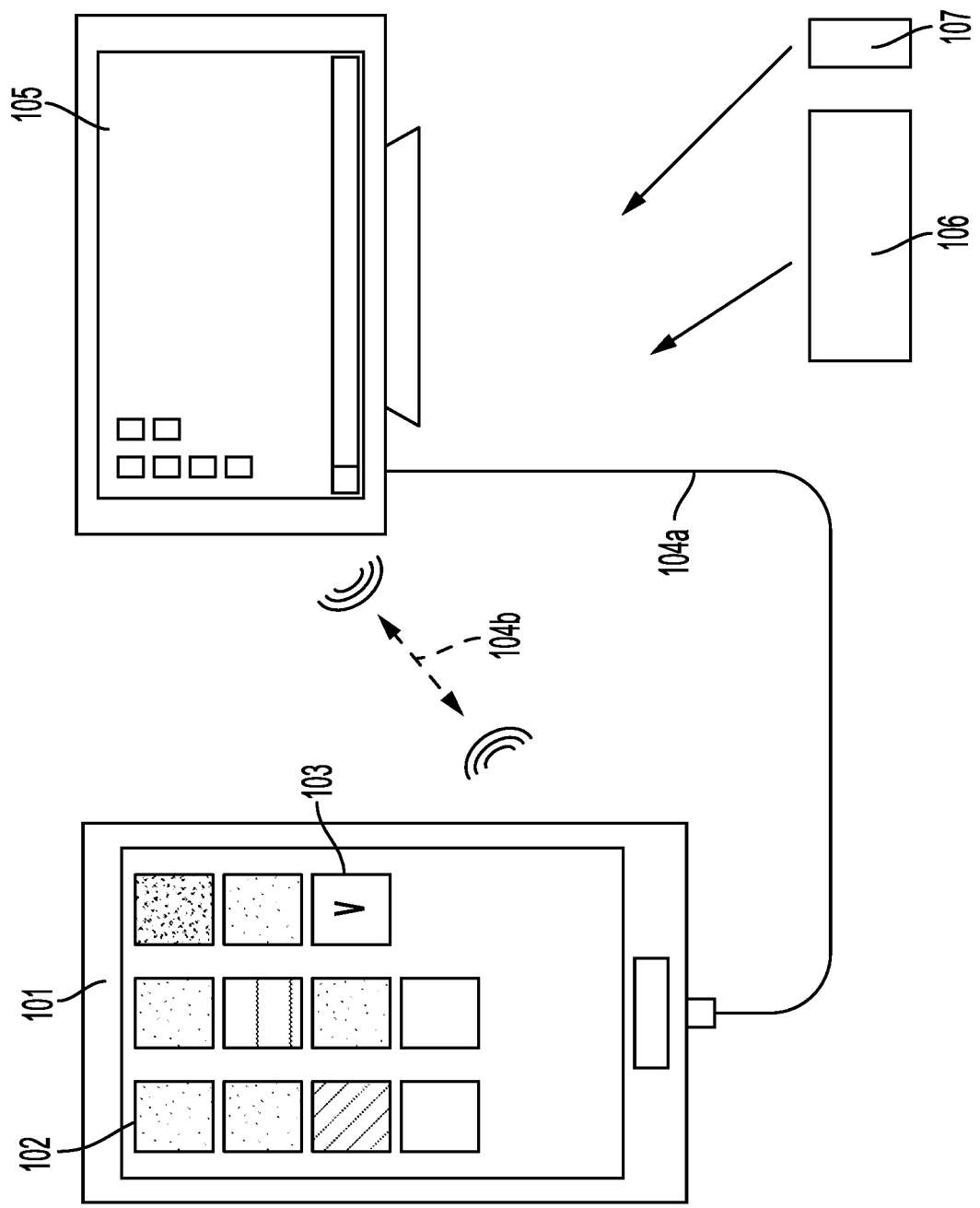
FIG. 1 is a schematic block diagram of a virtualization system according to an embodiment of the invention.

FIG. 1 schematically shows a virtualization system according to the invention. The virtualization system at least comprises a first device 101 having a first operating system. For example, the first device 101 may be a mobile device, such as a tablet computer or smart phone, and the first operating system may therefore be a mobile operating system. The first device 101 has a first display screen which can display one or more icons 102, at least some of which can represent respective applications which can be run on the mobile operating system. One of these applications which can be run on the mobile operating system is a virtualization application which includes a hypervisor and which may also be represented by an icon 103, although this is not mandatory. The virtualization application is operable as a guest operating system of the first operating system acting as a host operating system. The guest operating system is either a desktop operating system or a desktop-optimized operating system. The mobile device 101 can be connected, for example via a cable connection 104a, a wireless connection 104b and/or via a hub, with a second display screen 105, on which the desktop or desktop-optimized operating system hosted by the first operating system via the virtualization application can be displayed. The second display screen 105 may be a monitor or a TV screen, for example. The virtualization system optionally further comprises one or more peripheral components, such as a keyboard 106 and/or a mouse 107, either or both of which may optionally be connected to the system.

Figure 2:
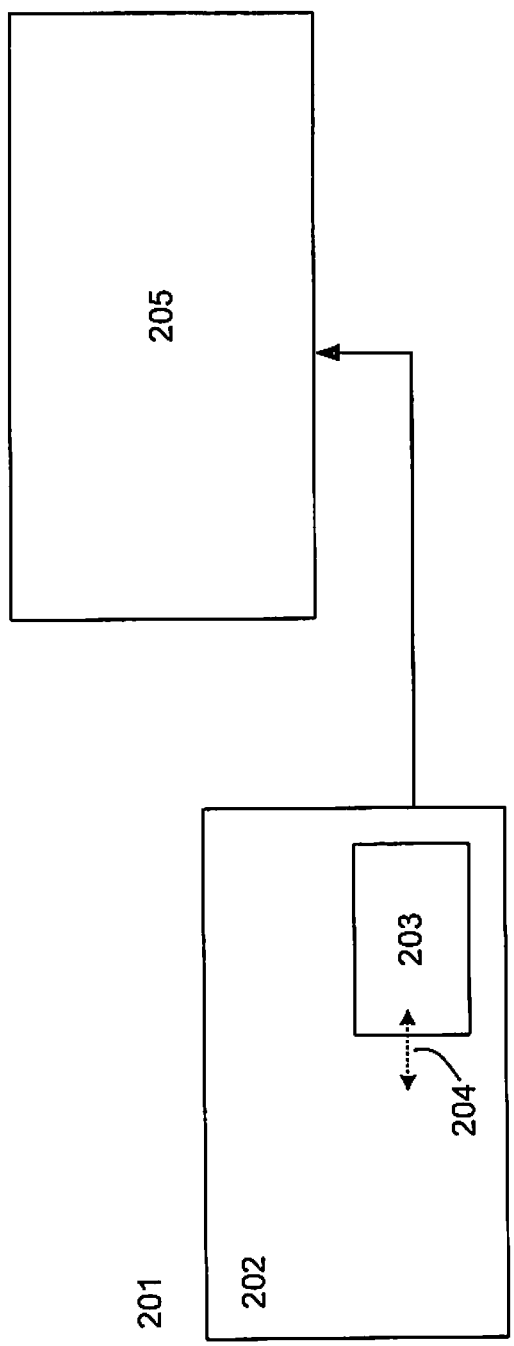
FIG. 2 is a schematic diagram of a mobile operating system and a desktop operating system operating according to an embodiment of the invention.

FIG. 2 schematically shows how the mobile operating system and the desktop operating system can work according to an embodiment of the invention. The mobile device 201 has a mobile operating system 202, which acts as a host operating system for a virtualized computer and desktop or desktop-optimized operating system 203, which is therefore a guest operating system thereof. The desktop or desktop-optimized operating system 203 can be displayed on separate monitor or TV screen 205 connected to the mobile device 201. When the second display screen 205 is connected to the first device 201, the virtualization application is launched automatically and continues to run for as long as the second display screen 205 remains connected to the first device 201. On the other hand, if the second display screen 205 is disconnected from the first device 201, the virtualization application does not launch and/or ceases to run. The mobile device 201 has multiple screen support, allowing for display of the guest operating system 203 on the second display screen 205 when the second display screen 205 is connected to the first device 201.

The virtualization application may be launched to run in the background of the mobile device 201, for example, although this is not mandatory. The first device 201 may further comprise a memory capable of storing a snapshot of the guest operating system 203. Thus, instantaneous booting-up of the guest desktop or desktop-optimized operating system 203 when the second display screen 205 is connected to the first device 201 can be achieved using snapshots of the virtualization stored in the memory of the mobile device 201.

Isolated data transfer 204 can occur between the mobile operating system 202 and the virtualized computer and desktop operating system 203. Whenever a transfer of data is needed, either from the mobile operating system to the desktop operating system or vice versa, complete isolation of the data is required. In order to achieve this, a novel method can be used, according to which, a lookup table consisting of rules and also a common folder between the mobile operating system (host OS) and the desktop operating system (guest OS) are established.

Figure 3:
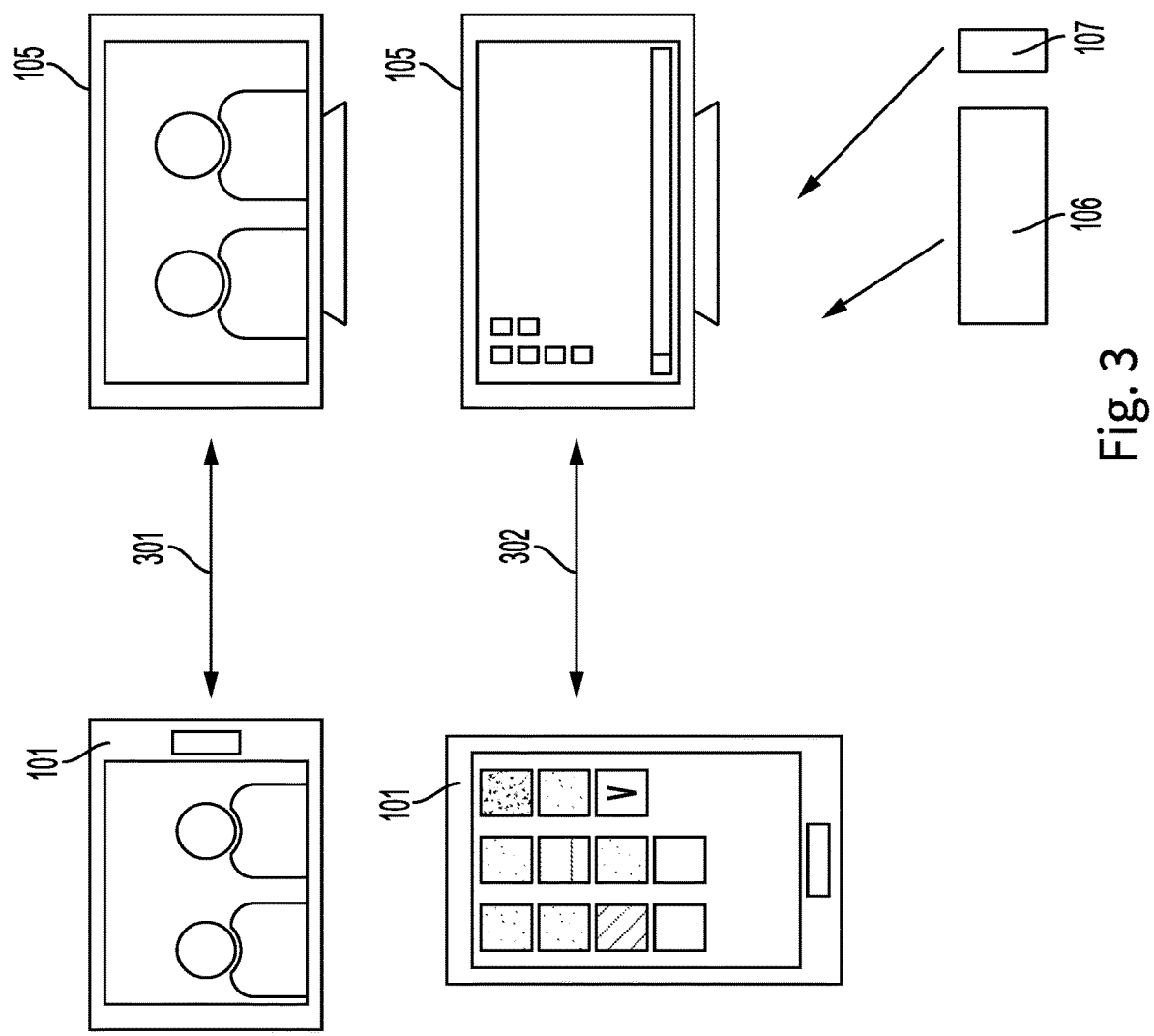
FIG. 3 is a diagram schematically representing switching between screen mirroring and virtualization in a virtualization system according to an embodiment of the invention.

FIG. 3 schematically shows switching between screen mirroring and virtualization in a virtualization system according to an embodiment of the invention. In the top half of FIG. 3, whatever is displayed on a screen of the mobile device 101 is mirrored 301 on the monitor or TV screen 105. In the bottom half of FIG. 3, the desktop operating system, which is guested by the mobile operating system of the mobile device 101 acting as a host operating system, is instead displayed 302 on the monitor or TV screen 105. The system can switch between these two different modes of operation. For example, the system can estimate whether to mirror the screen contents of the mobile device 101 on the monitor or TV screen 105 (as in the top half of FIG. 3) or whether to display the desktop operating system guested by the mobile operating system of the mobile device 101 (as in the bottom half of FIG. 3) instead. Switching between these two different modes of operation can be according to whether a certain condition is fulfilled. Thus, for example, if a video stream is playing on the screen of the mobile device 101, the system prioritizes screen mirroring of the screen contents of the mobile device 101 on the monitor or TV screen 105, as in the top half of FIG. 3. If, on the other hand, a keyboard 106 and/or a mouse 107 is connected to the system, for example, the system instead prioritizes displaying the desktop operating system on the monitor or TV screen 105, as in the bottom half of FIG. 3. These prioritizing activities can either be automatic or selective by a user.

Figure 4:
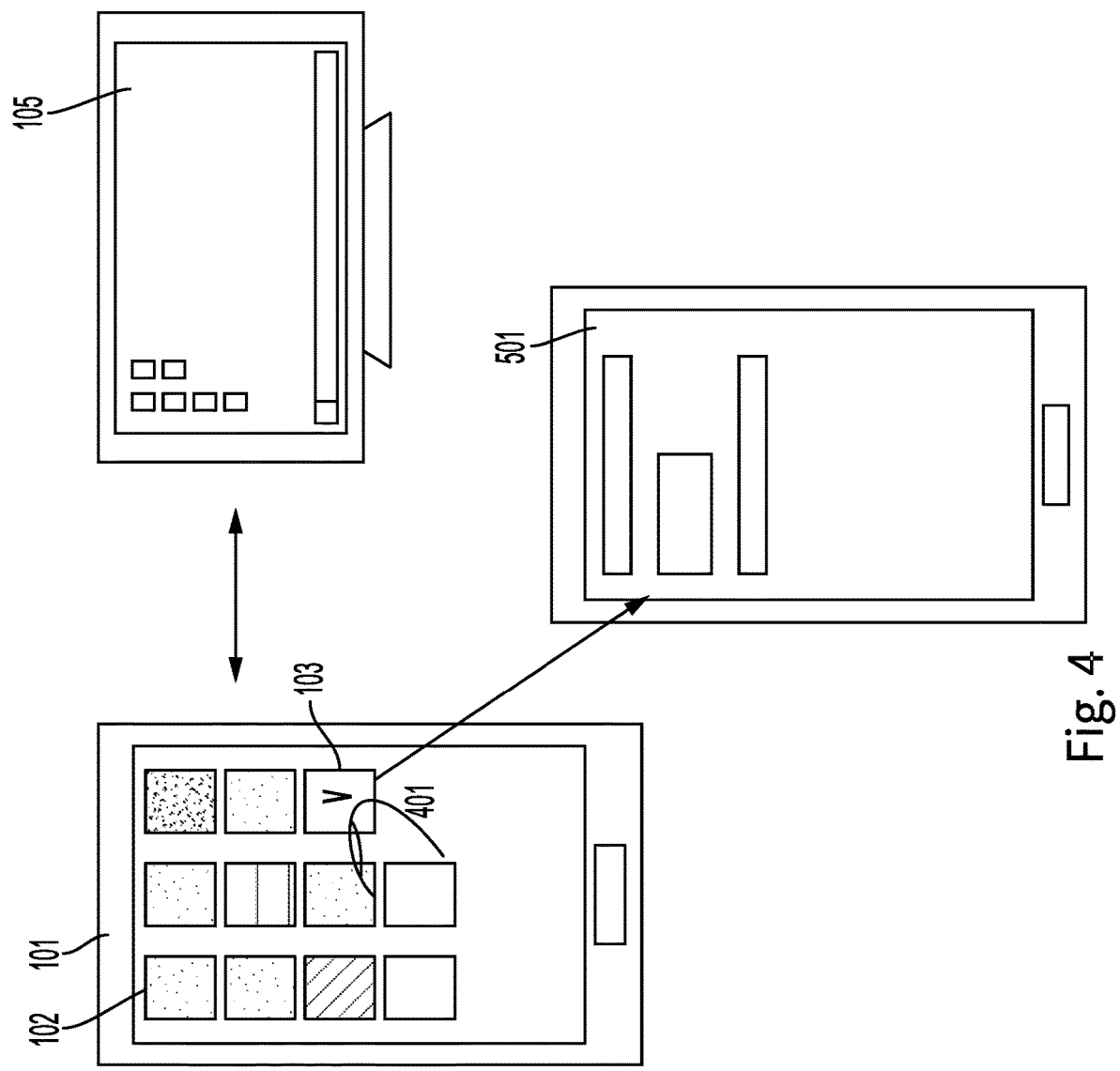
FIG. 4 is a schematic diagram of a user accessing a virtualization system according to an embodiment of the invention.

FIG. 4 schematically shows how a user may access a virtualization system according to an embodiment of the invention. If the system is in virtualization mode, the guest desktop operating system will be displayed on monitor or TV screen 105. On the other hand, a display screen of the mobile device 101 can instead display one or more icons 102, at least some of which can represent respective applications which can be run on the mobile operating system, as shown in the top half of FIG. 4. One of these icons 102 can be an icon 103 representing the virtualization application. If the display screen of the mobile device 101 is a touch-sensitive display screen, for example, a user may touch the icon 103 with their finger 104 to access the virtualization application 501, which will then be displayed on the display screen of the mobile device 101, as is shown in the bottom half of FIG. 4. In this way, the user may then interact with and operate the virtualization application 501.

Thus, the present invention provides a virtualization system at least comprising a first device 101, 201 having a first operating system 202 and a first display screen. The virtualization system also at least comprises a second display screen 105, 205 which is separate from the first device, but which is connectable to the first device 101, 201, for example by cable 104*a* or wireless 104*b* connection. The first device has a virtualization application 501 operable as a guest operating system 203 of the first operating system 202 acting as a host operating system. The guest operating system 203 is a desktop operating system or a desktop-optimized operating system. The virtualization application 501 is launched upon connection of the second display screen 105, 205 to the first device 101, 201 for display of the guest operating system 203 on the second display screen 105, 205. The system may optionally further comprise one or more peripheral components, such as a keyboard 106 and/or a mouse 107, for example. The system can determine whether to mirror the screen contents of the first device 101, 201 on the second display screen 105, 205 or whether to display the guest operating system 203 on the second display screen 105, 205, according to a predetermined condition, for example according to whether such peripheries are connected. The present invention provides a corresponding method of virtualizing a desktop operating system or a desktop-optimized operating system on a first device 101, 201, such as a mobile device, for display on a second display screen 105, 205, such as a monitor or TV screen Reference Numerals:

| | |
|---|---|
| 101 | Device with mobile OS |
| 102 | Applications on mobile OS |
| 103 | Virtualization application including hypervisor |
| 104a | Cable connection |
| 104b | Wireless connection |
| 105 | Monitor or TV screen where desktop OS can be displayed |
| 106 | Optionally connected keyboard |
| 107 | Optionally connected mouse |

-continued

Reference Numerals:

| | |
|---|---|
| 201 | Mobile device |
| 202 | Mobile OS |
| 203 | Virtualized computer and desktop OS |
| 204 | Isolated data transfer |
| 205 | Monitor or TV screen |
| 301 | Screen mirroring (connection can be either cable or wireless) |
| 302 | Virtualizing (connection can be either cable or wireless) |
| 401 | Finger of user |
| 501 | Virtualization application |

The invention claimed is:

1. A system comprising:
a first device having a first operating system and a first display screen, wherein the first operating system is configured to execute a second operating system that is a desktop operating system or a desktop-optimized operating system; and
a second display screen separate from the first device, the second display screen being connectable to the first device,
wherein the second operating system is configured to be launched on the first device upon connection of the second display screen to the first device such that the second operating system is displayed on the second display screen, and
wherein the system is configured to mirror an image displayed on the first display screen on the second display screen, and is switchable between such screen mirroring and display of the second operating system on the second display screen in response to a predetermined condition.

2. The system according to claim 1, wherein the first device is a mobile device and the first operating system is a mobile operating system.

3. The system according to claim 1, wherein the second display screen is a monitor or a TV screen.

4. The system according to claim 1, wherein the first device comprises a memory configured to store a snapshot of the second operating system and wherein the second operating system is configured to be launched using the snapshot.

5. The system according to claim 1, wherein transfer of data between the first operating system and the second operating system is configured to be isolated.

6. The system according to claim 5, the first device comprising a lookup table of rules and a common folder between the first operating system and the second operating system that are usable to isolate the transfer of data.

7. The system according to claim 1, wherein the predetermined condition is video being displayed on the first display screen.

8. The system according to claim 1, wherein the predetermined condition is selectable by a user.

9. A method comprising:
providing a first device with a first operating system that is configured to execute a second operating system that is a desktop operating system or a desktop-optimized operating system, the first device comprising a first display screen;
connecting the first device to a second display screen that is separate from the first device;
launching the second operating system on the first device upon connection of the second display screen to the first device;

displaying the second operating system on the second display screen;
mirroring an image displayed on the first display screen on the second display screen; and
switching between such screen mirroring and display of the second operating system on the second display screen in response to a predetermined condition.

10. The method according to claim 9, wherein launching the second operating system comprises launching the second operating system with a snapshot of the second operating system stored in a memory of the first device.

11. The method according to claim 9, further comprising transferring data between the first operating system and the second operating system using a lookup table consisting of rules and a common folder between the first operating system and the second operating system to isolate a transfer of data.

12. The system according to claim 1, further comprising a peripheral component, wherein the predetermined condition is the peripheral component being connected to the system.

13. The system according to claim 12, wherein the peripheral component comprises a keyboard or a mouse.

* * * * *